United States Patent
Kemmerling et al.

(10) Patent No.: US 9,587,589 B2
(45) Date of Patent: Mar. 7, 2017

(54) BOOSTED INTERNAL COMBUSTION ENGINE WITH PARTIAL DEACTIVATION AND METHOD FOR THE OPERATION OF AN INTERNAL COMBUSTION ENGINE OF SAID TYPE

(71) Applicant: Ford Global Technologies, LLC, Dearborn, MI (US)

(72) Inventors: Joerg Kemmerling, Monschau (DE); Franz Arnd Sommerhoff, Aachen (DE); Helmut Matthias Kindl, Aachen (DE); Vanco Smiljanovski, Bedburg (DE); Werner Willems, Aachen (DE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 14/604,467

(22) Filed: Jan. 23, 2015

(65) Prior Publication Data
US 2015/0204279 A1    Jul. 23, 2015

(30) Foreign Application Priority Data
Jan. 23, 2014   (DE) .................. 10 2014 201 215

(51) Int. Cl.
*F02M 25/07* (2006.01)
*F02B 37/04* (2006.01)
(Continued)

(52) U.S. Cl.
CPC ......... *F02M 25/0706* (2013.01); *F02B 37/04* (2013.01); *F02B 39/10* (2013.01);
(Continued)

(58) Field of Classification Search
CPC ...... F02D 13/02; F02D 13/0207; F02D 17/02; F02D 41/0007; F02D 41/0087;
(Continued)

(56) References Cited

U.S. PATENT DOCUMENTS 5,131,229 A * 7/1992 Kriegler .................. F02B 37/00
                                                   123/25 B
6,651,431 B1 * 11/2003 Yang ....................... F01D 9/026
                                                   123/559.1
(Continued)

FOREIGN PATENT DOCUMENTS

| DE | 10023022 A1 | 11/2001 |
| DE | 102005008578 A1 | 9/2005 |
| DE | 202013102075 U1 | 6/2013 |

OTHER PUBLICATIONS

Sommerhoff, F. et al., "Exhaust-Gas-Turbocharged Applied-Ignition Internal Combustion Engine Having at Least Two Turbines, and Method for Operating and Internal Combustion Engine of Said Typpe," U.S. Appl. No. 14/692,103, filed Apr. 21, 2015, 40 pages.

*Primary Examiner* — John Kwon
*Assistant Examiner* — Johnny H Hoang
(74) *Attorney, Agent, or Firm* — Greg Brown; John D. Russell; B. Anna McCoy (57) ABSTRACT

An internal combustion engine system is provided herein. The internal combustion engine includes an active cylinder, a selectively deactivatable cylinder, the active cylinder and selectively deactivatable cylinder each coupled to an intake system and exhaust-gas discharge system, an exhaust-gas turbocharger having a turbine positioned in the exhaust-gas discharge system and a compressor positioned in the intake system, a blower positioned in the intake system downstream of the compressor, and a bypass line bypassing the blower and including a shut-off valve.

20 Claims, 2 Drawing Sheets

(51) Int. Cl.
*F02B 39/10* (2006.01)
*F02D 17/02* (2006.01)
*F02D 13/02* (2006.01)
*F02D 23/00* (2006.01)
*F02D 41/00* (2006.01)

(52) U.S. Cl.
CPC ......... *F02D 13/0207* (2013.01); *F02D 17/02* (2013.01); *F02D 23/00* (2013.01); *F02D 41/0007* (2013.01); *F02D 41/0087* (2013.01); *F02M 26/08* (2016.02); *F02D 2041/0012* (2013.01); *Y02T 10/144* (2013.01); *Y02T 10/18* (2013.01)

(58) Field of Classification Search
CPC .. F02D 2041/0012; F02B 37/04; F02B 39/10; F02M 25/07; F02M 25/0706; Y02T 10/18; Y02T 10/144
USPC .............. 123/559.1, 568.11, 568.25–568.29; 701/108; 60/600, 502, 605.1, 605.2
See application file for complete search history.

(56) References Cited

U.S. PATENT DOCUMENTS

| | | | |
|---|---|---|---|
| 7,167,792 B1* | 1/2007 | Kolmanovsky | F02M 27/02 123/345 |
| 2005/0028797 A1* | 2/2005 | Janssen | F02M 26/59 123/568.26 |
| 2005/0050883 A1* | 3/2005 | Nishimura | F01N 3/035 60/286 |
| 2007/0119428 A1* | 5/2007 | Leone | F02B 37/00 123/527 |
| 2007/0234982 A1* | 10/2007 | Kolmanovsky | F01L 9/04 123/90.11 |
| 2007/0235005 A1* | 10/2007 | Lewis | F01L 9/04 123/322 |
| 2009/0145398 A1* | 6/2009 | Kemeny | F02B 33/22 123/25 C |
| 2010/0229806 A1* | 9/2010 | Kemeny | F02B 33/22 123/2 |
| 2013/0008161 A1* | 1/2013 | Flohr | F02B 37/001 60/600 |

* cited by examiner

BOOSTED INTERNAL COMBUSTION ENGINE WITH PARTIAL DEACTIVATION AND METHOD FOR THE OPERATION OF AN INTERNAL COMBUSTION ENGINE OF SAID TYPE

CROSS REFERENCE TO RELATED APPLICATIONS

The present application claims priority to German Patent Application No. 102014201215.5, filed Jan. 23, 2014, the entire contents of which are hereby incorporated by reference for all purposes.

FIELD

The present disclosure relates to a boosted engine with cylinder deactivation and a method for controlling said boosted engine.

BACKGROUND AND SUMMARY

Internal combustion engines may be boosted by turbochargers or superchargers to increase engine performance, such as engine power output. Additionally, some internal combustion engines may include deactivatable cylinders to enable a portion of the engine cylinders to be deactivated when the power provided by the cylinders is not needed such as during low load operation. It will be appreciated that deactivation may include inhibiting intake air flow to the cylinder, fuel injection into the cylinders, and/or spark delivered to the cylinders in the case of a spark ignition engine.

Attempts have been made to incorporate both turbochargers and cylinder deactivation into internal combustion engines. However, the Inventors have recognized several drawbacks with engines utilizing both cylinder deactivation and boosting devices. For example, during cylinder deactivation the turbocharger may not be configured to efficiently deliver boost to the cylinders due to the decreased airflow. As a result, engine efficiency is decreased.

As such in one approach, an internal combustion engine system is provided. The internal combustion engine includes an active cylinder, a selectively deactivatable cylinder, the active cylinder and selectively deactivatable cylinder each coupled to an intake system and exhaust-gas discharge system, an exhaust-gas turbocharger having a turbine positioned in the exhaust-gas discharge system and a compressor positioned in the intake system, a blower positioned in the intake system downstream of the compressor, and a bypass line bypassing the blower and including a shut-off valve. Providing the blower in the intake system enables increased boost to be supplied to the cylinders during partial cylinder deactivation when the boost provided by the turbocharger decreases due to decreased exhaust gas flow through the turbine. In this way, combustion efficiency in the active cylinders can be increased during partial deactivation of the selectively deactivatable cylinder. As a result, engine efficiency and operation is improved during cylinder deactivation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

A boosted internal combustion engine is described herein. The internal combustion engine may include at least two cylinders, in which each cylinder has at least one outlet opening which is adjoined by an exhaust line for discharging the exhaust gases via an exhaust-gas discharge system. In other words, each cylinder may be in fluidic communication with the exhaust-gas discharger system. Exhaust ports, exhaust valves, etc., may be provided in the engine to enable the cylinders to be connected to the exhaust-gas discharge system. Additionally, each cylinder may have at least one inlet opening which is adjoined by an intake line for the supply of charge air via an intake system. In other words, each cylinder may be in fluidic communication with the intake system. Intake ports, intake valves, etc., may be provided in the engine to enable the cylinders to be connected to the intake system. Furthermore, at least two cylinders may be configured in such a way that they form at least two groups with in each case include at least one cylinder. The cylinder of a first group is a cylinder configured to operate (e.g., perform combustion cycles) even in the event of a partial deactivation of the internal combustion engine. Additionally, the cylinder in the second group may be formed as a load-dependent deactivatably switchable cylinder. In other words, the cylinder in the second group may be activated and deactivated.

As described herein, a deactivated cylinder includes a cylinder which does not receive one or more of fuel, intake airflow, and spark through the operation of various engine components, systems, etc., such as fuel injectors, intake/exhaust valves, shut-off valves, ignition devices, etc. It will be appreciated that intake airflow may only be decreased during cylinder deactivation, in one example. Partial deactivation as described herein includes engine operation where a first portion of the cylinders in the engine are active (e.g., performing combustion cycles) and a second portion of the cylinders in the engine are deactivated (e.g., not performing complete combustion cycles). Additionally, the engine may have an exhaust-gas turbocharger which includes a turbine arranged in the exhaust-gas discharge system and a compressor arranged in the intake system. Furthermore, the engine may include an exhaust-gas recirculation arrangement.

A method for operating an internal combustion engine of said type is also described herein. An internal combustion engine of the above-stated type may be as a motor vehicle drive unit. Within the context of the present description, the expression "internal combustion engine" encompasses diesel engines and Otto-cycle engines and also hybrid internal combustion engines, which utilize a hybrid combustion process, and hybrid drives which may include not only the internal combustion engine but also an electric machine which is connected in terms of drive to the internal combustion engine and which receives power from the internal combustion engine or which, as a switchable auxiliary drive, additionally outputs power.

In the development of internal combustion engines, it may be desirable to reduce fuel consumption to improved overall engine efficiency. Fuel consumption and thus efficiency pose a problem in particular in the case of Otto-cycle engines, that is to say in the case of applied-ignition internal combustion engines. The reason for this lies in the principle of the operating process of the Otto-cycle engine. Load control can be carried out by a throttle flap provided in the intake system. By adjusting the throttle flap, the pressure of the inducted air downstream of the throttle flap can be reduced to a greater or lesser extent. The further the throttle flap is closed, that is to say the more said throttle flap blocks the intake system, the higher the pressure loss of the inducted air across the throttle flap, and the lower the pressure of the inducted air downstream of the throttle flap and upstream of the inlet into the at least two cylinders, that is to say combustion chambers. For a constant combustion chamber volume, it may be possible in this way for the air mass, that is to say the quantity, to be set by the pressure of the inducted air. This also explains why quantity regulation has proven to be disadvantageous specifically in the part-load range, because low loads may require a high degree of throttling and a pressure reduction in the intake system. As a result, the charge exchange losses may increase with decreasing load and increasing throttling.

To reduce the described losses, various strategies for dethrottling an Otto-cycle engine may be used. One approach for dethrottling the Otto-cycle engine is for example an Otto-cycle engine working process with direct injection. The direct injection of the fuel can enable a stratified combustion chamber charge. The direct injection of the fuel into the combustion chamber thus permits quality regulation in the Otto-cycle engine, within certain boundaries. The mixture formation may take place by the direct injection of the fuel into the cylinder or into the air situated in the cylinders, and not by external mixture formation, in which the fuel is introduced into the inducted air in the intake system.

Another option for improving the combustion process of an Otto-cycle engine may include using a variable valve assembly. By contrast to conventional valve assemblies, in which both the lift of the valves and also the control timing are invariable, these parameters which have an influence on the combustion process, and thus on fuel consumption, can be varied to a greater or lesser extent by the variable valve assembly. If the closing time of the inlet valve and the inlet valve lift can be varied, this makes reduced-throttling (e.g., throttling-free) and thus reduced loss (e.g., loss-free) load control possible, if desired. The mixture mass or charge air mass which flows into the combustion chamber during the intake process may then be controlled by the inlet valve lift and the opening duration of the inlet valve and not a throttle flap, if desired. Variable valve assemblies can be expensive and therefore may not be used in series production, due to the increased engine cost.

A further approach for dethrottling an Otto-cycle engine may be cylinder deactivation. Cylinder deactivation may include deactivation of individual cylinders in certain load ranges. The efficiency of the Otto-cycle engine in part-load operation can be improved, that is to say increased, by partial deactivation of one or more cylinders because the deactivation of one cylinder of a multi-cylinder internal combustion engine increases the load on the other cylinders, which remain in operation, if the engine power remains constant, such that the throttle flap is opened further in order to introduce a greater air mass into said cylinders, whereby dethrottling of the internal combustion engine is attained overall. During the partial deactivation, the cylinders which are active (e.g., in operation) can operate in the region of higher loads, at which the specific fuel consumption is lower. Therefore, the load collective can be shifted toward higher loads. The lower specific fuel consumption furthermore can also lead to improved emissions characteristics, in particular lower $CO_2$ emissions.

The cylinders which remain in operation during the partial deactivation may also exhibit improved mixture formation due to the greater air mass or mixture mass supplied.

Further advantages with regard to efficiency are attained in that a deactivated cylinder, due to the absence of combustion, may not generate substantial wall heat losses due to heat transfer from the combustion gases to the combustion chamber walls.

Diesel engines, that is to say auto-ignition internal combustion engines, due to the quality regulation on which they are based mayexhibit greater efficiency, that is to say lower fuel consumption, than Otto-cycle engines in which the load—as described above—is adjusted by throttling or quantity regulation with regard to the charge of the cylinders, there is, even in the case of diesel engines, potential for improvement with regard to engine fuel consumption and efficiency.

One concept for reducing fuel consumption, also in the case of diesel engines, is cylinder deactivation. For instance, cylinder deactivation may include deactivation of individual cylinders in certain load ranges. The efficiency of the diesel engine in part-load operation can be improved, that is to say increased, by partial deactivation of one or more cylinders, because, even in the case of the diesel engine, in the case of constant engine power the deactivation of at least one cylinder of a multi-cylinder internal combustion engine can increase the load on the other cylinders still in operation, such that said cylinders operate in regions of higher loads, in which the specific fuel consumption is lower. Therefore, the load collective in part-load operation of the diesel engine can be shifted toward higher loads.

With regard to the wall heat losses, the same advantages can be attained in diesel engines as in the case of the Otto-cycle engine, for which reason reference is made to the corresponding statements given. In the case of diesel engines, the partial deactivation may also reduce the likelihood (e.g., prevent) the fuel-air mixture from becoming too lean as part of the quality regulation in the event of decreasing load as a result of a reduction of the fuel quantity used.

The internal combustion engine described herein may also be configured for partial deactivation, that is to say an internal combustion engine with at least one deactivatable cylinder.

Previous multi-cylinder internal combustion engines with partial deactivation and the associated methods for operating said internal combustion engines, have considerable potential for improvement, as will be explained briefly below.

If, for the purpose of the partial deactivation, the fuel supply to the deactivatable cylinders is stopped, that is to say discontinued, the deactivated cylinders continue to participate in the charge exchange if the associated valve drive of said cylinders is not deactivated or cannot be deactivated. The charge exchange losses thus generated by the deactivated cylinders lessen, and counteract, the improvements achieved with regard to fuel consumption and efficiency through the partial deactivation, such that the benefit of the partial deactivation is at least partially lost, that is to say the partial deactivation in fact yields an altogether less pronounced improvement than theoretically possible.

By contrast, if it is ensured that the deactivated cylinders no longer participate in the charge exchange and consequently can no longer generate charge-exchange losses, this can lead, in the case of internal combustion engines boosted by exhaust-gas turbocharging, to problems of a different nature, because the turbine of the exhaust-gas turbocharger is designed for a particular exhaust-gas flow rate and thus also for a particular number of cylinders. If the deactivated cylinders do not participate in the charge exchange, the overall mass flow through the cylinders of the internal combustion engine is reduced due to the omission of the mass flow through the deactivated cylinders. The exhaust-gas mass flow conducted through the turbine decreases, and the turbine pressure ratio decreases as a result. This has the result that the charge pressure ratio likewise decreases, that is to say the charge pressure falls. The cylinders that remain in operation are therefore supplied with less charge air than before the partial deactivation, this being the case despite the fact that a greater charge-air flow rate is supplied to said cylinders in order to maintain the engine power during partial deactivation. The small charge-air flow may also have the effect that the compressor operates beyond the surge limit.

The effects described above may lead to a restriction of the practicability of the partial deactivation, specifically to a restriction of the load range in which the partial deactivation can be used. The reduced charge-air flow rate that is supplied to the cylinders which are in operation during the partial deactivation may also reduce the effectiveness or quality of the combustion and may have an adverse effect on the fuel consumption and pollutant emissions.

The charge pressure during a partial deactivation, and thus the charge-air flow rate supplied to the cylinders that remain in operation, could for example be increased by a small configuration of the turbine cross section and by simultaneous exhaust-gas blow-off, whereby the load range relevant for a partial deactivation would also be expanded again. This approach however has the disadvantage that the boosting behavior may be inadequate when all the cylinders are in operation, in particular at relatively high loads and engine speeds.

The charge pressure during a partial deactivation, and thus the charge-air flow rate supplied to the cylinders that are still in operation, could also be increased via a variable geometry turbine, which enables adjustment of the effective turbine cross section to the present exhaust-gas mass flow. The exhaust-gas back pressure in the exhaust-gas discharge system upstream of the turbine may then simultaneously increase, leading in turn to higher charge-exchange losses in the cylinders that are still in operation.

As such a boosted internal combustion engine is provided herein which enables improvement with regard to the partial deactivation and boosting. Additionally, a method for operating a supercharged internal combustion engine of said type is also described herein.

As such, a supercharged internal combustion engine having at least two cylinders may be provided. Each cylinder may have one outlet opening which is adjoined by an exhaust line for discharging the exhaust gases via an exhaust-gas discharge system. Additionally, each cylinder may have at least one inlet opening which is adjoined by an intake line for the supply of charge air via an intake system.

Furthermore, at least two cylinders may be configured in such a way that they form at least two groups with in each case at least one cylinder, wherein the at least one cylinder of a first group may be a cylinder which is in operation even in the event of a partial deactivation of the internal combustion engine. Additionally, the at least one cylinder of a second group may be formed as a load-dependently deactivatably switchable cylinder. The engine may further include at least one exhaust-gas turbocharger which includes a turbine arranged in the exhaust-gas discharge system and a compressor arranged in the intake system. The engine may also include an exhaust-gas recirculation (EGR) arrangement. The engine may further include a blower is provided in the intake system downstream of the compressor and a bypass line branching off from the intake system between the compressor and the blower and issues into the intake system downstream of the blower, where a bypass shut-off element is positioned in the bypass line.

For boosting, the internal combustion engine may be equipped with the exhaust-gas turbocharger as well as a blower, whereby the boosting behavior, that is to say the torque characteristics, can be considerably improved, in particular during the partial deactivation, due to operation of the blower, if desired.

If the deactivated cylinders do not participate in the charge exchange during the partial deactivation, it may be possible for a drop in the charge pressure to be counteracted by operation of the blower, and even for a higher (e.g., adequately high) charge pressure to be generated. In this way, the cylinders that are in operation during partial deactivation can be supplied with the relatively high charge-air flow rate needed for maintaining the engine power output at a desirable level. For this purpose, proceeding from a state in which the blower is not in operation, the blower may be activated and the bypass line that bypasses the blower can be blocked by operation of the shut-off element positioned in the bypass line.

In this respect, the internal combustion engine described above may be particularly advantageous in engines where the supply of charge air to the deactivated cylinders is reduced (e.g., substantially prevented) during partial deactivation. In such an example, there may be the risk of an excessively low charge pressure, resulting from the reduced exhaust-gas mass flow through the turbine, decreasing the applicability of the partial deactivation. However, the provision of an additional blower can lead to an expanded applicability of the partial deactivation, specifically to an expansion of the load range in which the partial deactivation can be used. The increased charge-air flow rate that is supplied to the cylinders which are in operation during the partial deactivation can also increase the effectiveness and quality of the combustion and may also have an advantageous effect on the fuel consumption and pollutant emissions.

It will be appreciated that the internal combustion engine described herein enables improvement with regard to partial deactivation and boosting. The internal combustion engine may include at least two cylinders or at least two groups with in each case at least one cylinder. In this respect, internal combustion engines with three cylinders which are configured in three groups with in each case one cylinder, or internal combustion engines with six cylinders which are configured in three groups with in each case two cylinders, have been contemplated. Within the context of a partial deactivation, the three cylinder groups may be activated or deactivated in succession, whereby two-time switching may also be realized. The partial deactivation can thereby be improved. The cylinder groups may also comprise a different number of cylinders, for example may form one group with one cylinder and one group with two cylinders in the case of a three-cylinder engine. Thus, engine with different numbers of cylinders and cylinder configurations have been contemplated with one or more cylinders in the engine being selectively deactivatable.

The engine described above enables an improvement in efficiency of the internal combustion engine during part-load operation, that is to say at low and medium loads, where the load amounts to less than 50% (e.g., less than 30%) of the peak load (e.g., maximum load $T_{max}$) at the present engine speed.

An exhaust-gas recirculation arrangement may be provided in the engine which includes a line which branches off from the exhaust-gas discharge system and issues into the intake system. Exhaust-gas recirculation, that is to say the recirculation of combustion gases, enables nitrogen oxide emissions from the engine to be reduced. For instance, it may be possible for the nitrogen oxide emissions to be considerably reduced with increasing exhaust-gas recirculation rate. Here, the exhaust-gas recirculation rate $x_{EGR}$ can be determined as $X_{EGR}=m_{EGR}$ ($m_{EGR}+m_{fresh\ air}$), where $m_{EGR}$ denotes the mass of recirculated exhaust gas and $m_{fresh\ air}$ denotes the supplied compressed fresh air. To obtain a considerable reduction in nitrogen oxide emissions, high exhaust-gas recirculation rates may be used which may be of the order of magnitude of $x_{EGR}\approx 60\%$ to 70%.

In one advantageous example, the boosted internal combustion engine may include a valve for adjusting the recirculated exhaust-gas flow rate is arranged in the line of the exhaust-gas recirculation arrangement.

In another advantageous example, the load-dependently switchable cylinder(s) of the second group may be equipped at least at the inlet side with a variable valve assembly in the internal combustion engine. The variable valve assembly may include a valve and drive elements configured to adjust the timing and magnitude of valve lift and in some example may enable full deactivation of the valve lift. Therefore, via the variable valve assembly, the inlet valves of the deactivated cylinders can be deactivated, such that the deactivated cylinders no longer participate in the charge exchange and cannot generate any charge-exchange losses.

The charge air mass introduced into a deactivated cylinder during the charge exchange may also be controlled in a targeted fashion via a variable valve assembly. For example, the inlet valve lift and/or the opening duration of the inlet valve may be controlled to provide a desired charge air mass into a deactivated cylinder. It will be appreciated that variable valve assemblies may be configured to permit not only a deactivation of the inlet valves but also targeted dosing of the charge-air mass that is introduced.

A reduction of the charge-air flow may have advantages, in the event of partial deactivation, in relation to stoppage of the charge-air flow. The mass flow through the internal combustion engine may be greater in the case of a reduction of the charge-air supply than if the supply of charge air were completely stopped. In the case of internal combustion engines boosted by exhaust-gas turbocharging, the greater mass flow leads to a higher turbine pressure ratio and thus to a higher charge pressure, such that a greater charge-air flow rate can be provided to the cylinders.

Furthermore, tests have shown that, in individual cases, the charge-exchange losses can be reduced noticeably or to the greatest extent if the charge-air supply is not completely stopped but is merely reduced.

In addition or alternatively, the at least one load-dependently switchable cylinder may also be equipped at the outlet side with an at least partially variable or switchable valve drive.

In another advantageous example, the boosted internal combustion engine may include an intake system of the at least one load-dependently switchable cylinder of the second group equipped with at least one intake shut-off element. Therefore, it may also be possible for at least one shut-off element to be provided in the intake system of the second cylinder group. The intake shut-off element may be configured for the adjustment, that is to say dimensioning, of the charge-air flow rate supplied to the at least one cylinder of the second group, specifically also, or in particular, during partial deactivation.

In one example, the portion of the intake system corresponding to the second group may be equipped with at least one shut-off element. The shut-off element can be configured to adjust the charge-air flow rate supplied to the at least one cylinder of the second group.

In another example, the intake lines of the cylinders of the second group may merge to form an intake line, thus forming an inlet manifold, and said inlet manifold may be equipped with the at least one intake shut-off element. In such an example, the intake shut-off element may be arranged in the intake line of the intake manifold. In this example, a single shut-off element may be used for reducing or adjusting the charge-air supply to the at least one cylinder of the second group.

Additionally, an intake shut-off element may also be provided in each intake line of a cylinder of the second group. However, this increases the number of shut-off elements in the engine, in particular if the cylinders have more than one inlet opening and/or the second group comprises more than one cylinder.

In another example, each intake line of each cylinder of the second group can be equipped with an intake shut-off element in the internal combustion engine.

In yet another example, internal combustion engines having one cylinder head and two cylinders may be used in which each cylinder has an inlet opening for the supply of the charge air. In such an example, the single intake line of the cylinder may simultaneously form the inlet manifold and the intake line of the cylinder group comprising the single cylinder.

In yet another example, the intake shut-off element in the internal combustion engine may be a valve or a pivotable flap. In such an example, the intake shut-off element may be electrically, hydraulically, pneumatically, mechanically or magnetically controllable by an engine controller, for instance. Further in this example, the intake shut-off element may be switchable at least in two-stage fashion, that is to say if appropriate in multi-stage fashion, such as between a closed position and an open position.

Further in this example, the intake shut-off element in the internal combustion engine may be continuously adjustable. The configuration of the shut-off element as a continuously adjustable shut-off element permits precise dosing of the charge-air flow rate introduced into the at least one cylinder of the second group, if desired. The control of the shut-off element may take into consideration the load T, the engine speed n, the coolant temperature in the case of a liquid-cooled internal combustion engine, the oil temperature and/or the like.

In yet another example, the exhaust-gas discharge system of the load-dependently switchable cylinder of the second group may be equipped with at least one exhaust shut-off element. In such an example, a recirculation line may be provided which branches off from the exhaust-gas discharge system of the at least one load-dependently switchable cylinder of the second group upstream of the at least one exhaust shut-off element which issues into the intake system of the at least one load-dependently switchable cylinder, wherein a EGR shut-off element is positioned in the recirculation line.

In another example, the discharge of the exhaust gas from the deactivated cylinders via the exhaust-gas discharge system can be reduced (e.g., prevented) during a partial deactivation via adjustment of the exhaust shut-off element, without the switchable cylinders having to be equipped with switchable valve drives, which entail high costs. For this purpose, an exhaust shut-off element may be provided in the exhaust-gas discharge system of the load-dependently switchable cylinders or in the exhaust line of each load-dependently switchable cylinder. By operation of the exhaust shut-off element, the exhaust line or the exhaust-gas discharge system may either be opened up for the discharge of exhaust gas or may be blocked during partial deactivation, that is to say when the switchable cylinders are deactivated.

The deactivated cylinders may continue to participate in the charge exchange because the associated valve drive of said cylinders continues to be actuated, that is to say continues to operate, and is not deactivated together with the cylinders. The discharge of exhaust gas may however be stopped, that is to say modified, as described above, wherein the exhaust gas is not discharged but is recirculated to the inlet side. In one example, a deactivated cylinder may be supplied not with charge air but rather with dedicated exhaust gas from the cylinder-specific exhaust-gas discharge system, which exhaust gas may be introduced via the recirculation line into the intake system of the deactivated cylinder in order to reduce the charge-exchange losses of the deactivated cylinder. In such an example, the recirculation line may serve as a short-circuit line and effects a pressure equalization between the inlet side and the outlet side of a deactivated cylinder. This contributes considerably to the reduction of the charge-exchange losses. The deactivated cylinders pump the recirculated exhaust gas from the inlet side to the outlet side, in the manner of a blower.

By virtue of hot exhaust gas being conducted through the deactivated cylinders during the partial deactivation, said cylinders retains a high temperature. This has advantages in particular with regard to pollutant emissions, in particular with regard to the emissions of unburned hydrocarbons, because the deactivated cylinders can reach or exhibit their operating temperature again immediately after the end of the partial deactivation. Strictly speaking, hot exhaust gas may not recirculated via the recirculation line permanently during the partial deactivation, it rather being the case that, at least during the first working cycle of the partial deactivation, the exhaust gas of the preceding working cycle, and thus the hot exhaust gas of the final fired working cycle, is recirculated. During the subsequent working cycles of the partial deactivation, slowly cooling exhaust gas with a greater or lesser fraction of relatively cool charge air may then be introduced into the at least one deactivated cylinder. This is nevertheless referred to as the recirculation of hot exhaust gas.

The recirculation of hot exhaust gas into the deactivated cylinders duly does not increase the mass flow through the internal combustion engine. There are nevertheless resulting advantages for boosted internal combustion engines with exhaust-gas turbocharging. By contrast to concepts in which only charge air is supplied to the deactivated cylinders during the partial deactivation, the introduction of hot exhaust gas into the deactivated cylinders generates a higher exhaust-gas temperature and a higher exhaust-gas pressure in the exhaust gas situated in the exhaust-gas discharge system. Both result in greater exhaust-gas enthalpy, which is determined significantly by the exhaust-gas pressure and the exhaust-gas temperature. The greater exhaust-gas enthalpy, that is to say the greater exhaust-gas energy, prevailing at the turbine of the exhaust-gas turbocharger can lead to an increase in the charge pressure and thus in the charge-air flow rate. Furthermore, owing to the hotter exhaust gases, exhaust-gas aftertreatment systems arranged in the exhaust-gas discharge system reach their operating temperature or light-off temperature more quickly.

The EGR shut-off element may be configured for the adjustment of the recirculated exhaust-gas flow rate and of the pressure gradient between the inlet side and the outlet side of a deactivated cylinder. In this respect, the EGR shut-off element can also be used for keeping the exhaust-gas flow rate constant, that is to say uniform, during the partial deactivation.

Like the intake shut-off element, the bypass shut-off element and/or the exhaust shut-off element and/or the EGR shut-off element may be a valve or a pivotable flap or a throttle flap, and may be electrically, hydraulically, pneumatically, mechanically or magnetically controllable, by for instance an engine controller.

In an additional example, the boosted internal combustion engine may include a blower that is mechanically driven via a crankshaft in the engine, for example. Examples of the internal combustion engine may be used where the blower is an electrically driven blower. By contrast to a mechanically driven blower, no mechanical connection to the internal combustion engine may be used, if desired.

Further in one example, the blower may be designed for increased charge-air flow rate to be provided during partial deactivation. Two compressors may be arranged in series are provided on the inlet side, specifically the compressor of the exhaust-gas turbocharger and, situated downstream, the blower, in one example. During partial deactivation and when the bypass line is blocked, two-stage compression can therefore be realized in such an example where the blower compresses already-compressed charge air. The latter is—as in the case of the compressor of the high-pressure stage of a two-stage exhaust-gas turbocharging arrangement—a reason why the blower can be of relatively small dimensions, if desired. Furthermore, the blower may be activated only during partial deactivation, for which reason the blower, by contrast to the compressor of a high-pressure stage, may only have to supply charge air to one cylinder group. In this respect, the blower can be dimensioned to be smaller than a high-pressure compressor, if desired.

In yet another example, the turbine of the exhaust-gas turbocharger may have a variable turbine geometry. In yet another example, the turbine of the exhaust-gas turbocharger may include a wastegate.

In another example, the exhaust-gas aftertreatment system may be provided in the exhaust-gas discharge system. The exhaust-gas aftertreatment system may include an oxidation catalytic converter, a three-way catalytic converter, a storage catalytic converter, a selective catalytic converter and/or a particle filter.

In examples where the engine includes four cylinders in an in-line arrangement, two outer cylinders and the two inner cylinders may form in each case one group. That is to say that the two inner cylinders may be selectively deactivatable and the outer cylinder may be active cylinders or vice-versa. For example, if the ignition in the cylinders is initiated in accordance with the ignition sequence 1-2-4-3 or in accordance with the ignition sequence 1-3-4-2, it is possible for mutual influencing (e.g., cross-talk) of the cylinders of a group to be reduced (e.g., prevented), because two cylinders which have an ignition interval of 360° CA belong in each case to one cylinder group.

In other examples, the line of the exhaust-gas recirculation arrangement may branch off from the exhaust-gas discharge system upstream of the turbine of the at least one exhaust-gas turbocharger and may issue into the intake system downstream of the compressor of the at least one exhaust-gas turbocharger or downstream of the blower. In the case of said so-called high-pressure EGR arrangement, the exhaust gas is extracted from the exhaust-gas discharge system upstream of the turbine and is fed into the intake system downstream of the compressor, whereby the exhaust gas need not be subjected to exhaust-gas aftertreatment, in particular supplied to a particle filter, before being recirculated, because there is no risk of fouling of the compressor or blower via exhaust gas.

In the case of the operation of an internal combustion engine with exhaust-gas turbocharging and the simultaneous use of high-pressure EGR, a conflict may however arise because the recirculated exhaust gas is no longer available for driving the turbine. In the event of an increase in the exhaust-gas recirculation rate, the exhaust-gas flow introduced into the turbine decreases. The reduced exhaust-gas mass flow through the turbine leads to a lower turbine pressure ratio, as a result of which the charge-pressure ratio also falls, which equates to a smaller charge-air flow. One solution to this is so-called low-pressure EGR. By contrast to high-pressure EGR, in the case of low-pressure EGR, exhaust gas which has already flowed through the turbine is introduced into the intake system. For this purpose, the low-pressure EGR arrangement may have a recirculation line which branches off from the exhaust-gas discharge system downstream of the turbine and issues into the intake system upstream of the compressor.

The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor, or the blower, and compressed.

Since, within the low-pressure EGR arrangement, exhaust gas is conducted through the compressor or through the blower, said exhaust gas must be previously subjected to exhaust-gas aftertreatment, in particular in the particle filter. Depositions in the compressor which change the geometry of the compressor, in particular the flow cross sections, and thereby impair the efficiency of the compressor, can be reduced (e.g., prevented). The same can apply to the blower.

Each cylinder in the engine may be equipped with direct-injectors for the introduction of fuel directly into the cylinders. In such an example, each cylinder may be equipped with an injection nozzle for the purposes of direct injection. The fuel supply can be deactivated more quickly and more reliably, for the purposes of the partial deactivation, in the case of direct-injection internal combustion engines than in the case of internal combustion engines with intake pipe injection, in which fuel residues in the intake pipe can lead to undesired combustions in the deactivated cylinder. Nevertheless, examples of the internal combustion engine may be used in which intake pipe injectors (e.g., port fuel injectors) are provided for the purposes of supplying fuel.

A method for operating a supercharged internal combustion engine of an above-described type is also described herein. The method may be distinguished by the fact that the at least one switchable cylinder of the second group is switched as a function of the load T of the internal combustion engine, in such a way that said at least one switchable cylinder is deactivated if a predetermined load $T_{down}$ is undershot and is activated if a predetermined load $T_{up}$ is exceeded.

That which has already been stated with regard to the internal combustion engine also applies to the method, for which reason reference is generally made at this juncture to the statements made above with regard to the boosted internal combustion engine. The different internal combustion engines may use different method variants.

The limit loads $T_{down}$ and $T_{up}$ predefined for the undershooting and exceedance respectively may be of equal magnitude in some examples, though may also differ in magnitude, in other examples. When the internal combustion engine is in operation, the cylinders of the first cylinder group are cylinders which are permanently in operation (e.g., active cylinders) while the engine is running. Switching of the second cylinder group, that is to say an activation and deactivation of said second group, can be implemented.

In one example, the predetermined load $T_{down}$ and/or $T_{up}$ may be dependent on the engine speed n of the internal combustion engine. Then, there is not only one specific load, upon the undershooting or exceedance of which switching takes place regardless of the engine speed n. Instead, an example engine-speed-dependent approach is followed, and a region in the characteristic map is defined in which partial deactivation takes place. Further operating parameters of the internal combustion engine, for example the engine temperature or the coolant temperature after a cold start of the internal combustion engine, may be taken into consideration as a criterion for a partial deactivation.

Method variants, during the partial deactivation, may include using (e.g., operating) the blower to achieve a predetermined charge pressure, wherein the bypass line is blocked by the bypass shut-off element.

Example, method variants include reducing or stopping the supply of charge air to the at least one switchable cylinder of the second group during partial deactivation.

Other example method variants may include, during partial deactivation, introducing exhaust gas into the at least one switchable cylinder of the second group.

Additional example method variants may include deactivating (e.g., inhibiting) the fuel supply to the at least one switchable cylinder in the event of deactivation. This yields advantages with regard to fuel consumption and pollutant emissions, thus assisting the aim pursued by the partial deactivation, specifically that of reducing fuel consumption and improving efficiency. In the case of auto-ignition internal combustion engines, the fuel supply may be deactivated in order to reliably prevent an ignition of the mixture situated in the cylinder.

In one example the at least one cylinder which is in operation may be fired by auto-ignition. Thus in such an example, the engine may be a compression ignition engine (e.g., diesel engine).

In one example, it is also possible, for the operation of an Otto-cycle engine, to use a hybrid combustion process with auto-ignition, for example the so-called HCCI method, which is also referred to as the spatial ignition method or as the CAI method. Said method may be based on a controlled auto-ignition of the fuel supplied to the cylinder. Here, the fuel—as in the case of a diesel engine—may be burned with an excess of air, that is to say superstoichiometrically. The lean-burn Otto-cycle engine, owing to the low combustion temperatures, has relatively low nitrogen oxide emissions and, likewise owing to the lean mixture, has decreased (e.g., substantially zero) soot emissions. Furthermore, the HCCI method can lead to high engine thermal efficiency. Here, the fuel may be introduced both directly into the cylinder and also into the intake pipe.

Additionally, each cylinder may be equipped with an ignition device (e.g., spark plug) for the initiation of an applied ignition, wherein the ignition device of the at least one switchable cylinder is deactivated in the event of deactivation, in one example.

The above method variant relates to the use of the method in the case of an applied-ignition internal combustion engine, for example a direct-injection Otto-cycle engine, the cylinders of which may be equipped in each case with an ignition device for initiating an applied ignition.

Figure 1:
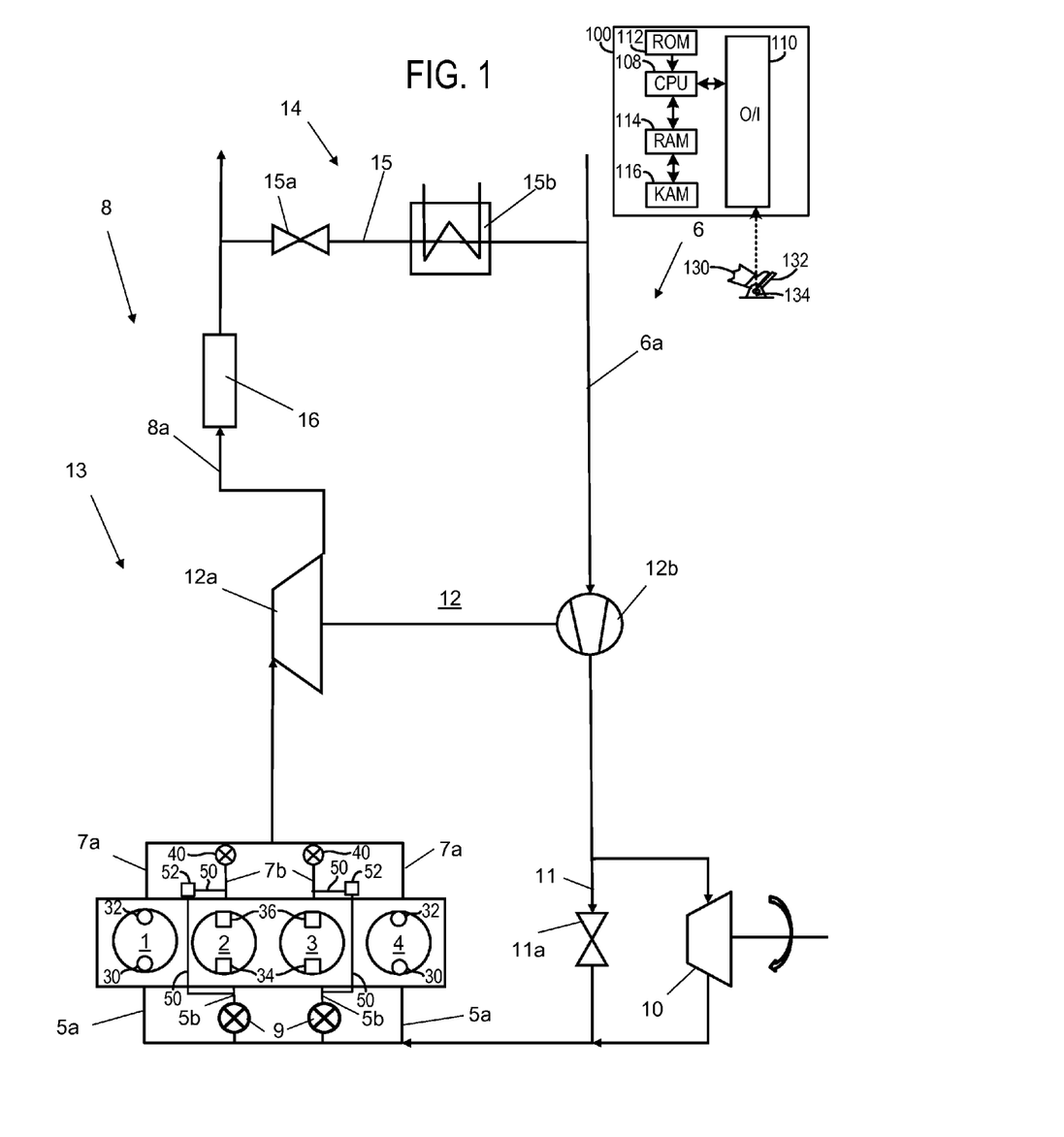
FIG. 1 schematically shows an example of a boosted internal combustion engine.

FIG. 1 schematically shows an example internal combustion engine 13. Said internal combustion engine is a four-cylinder in-line engine 13 in which the four cylinders 1, 2, 3, 4 are arranged along the longitudinal axis of the cylinder head, that is to say in a line. However, other suitable cylinder arrangements and cylinder quantities have been contemplated. For instance, the engine may include only two cylinders, the cylinders may be arranged in cylinder banks such as in a V-configuration, horizontally opposed configuration, etc.

Each cylinder 1, 2, 3, 4 has an intake line 5a, 5b for the supply of charge air via an intake system 6, and an exhaust line 7a, 7b for the discharge of the exhaust gases via an exhaust-gas discharge system 8. The intake lines 5a, 5b originate from a common intake line 6a (e.g., intake manifold). Additionally, the exhaust lines 7a, 7b merge to form a common exhaust line 8a (e.g., exhaust manifold).

The cylinders (1 and 4) each include an intake valve assemblies 30 and an exhaust valve assemblies 32. The valve assemblies may include valves as well as components configured to actuate the valves. The cylinders (2 and 3) each include intake valve assemblies 34 and exhaust valve assemblies 36. In one example, the intake valve assemblies 34 and/or the exhaust valve assemblies 36 may be variable valve assemblies. The variable valve assemblies may be configured to adjust the lift and/or timing of the valves. Specifically in one example, the variable valve assemblies may be configured to inhibit operation of the valves. The variable valve assemblies can include valves and drive componentry that enable the aforementioned adjustment in valve lift and/or timing. Additionally in one example, the intake valve assemblies 30 and exhaust valve assemblies 32 may be configured as variable valve assemblies.

The internal combustion engine 13 is equipped with an exhaust-gas turbocharger 12, in the depicted example. The turbocharger 12 includes a turbine 12a being positioned (e.g., arranged) in the exhaust line 8a (e.g., exhaust manifold) of the exhaust-gas discharge system 8 and the compressor 12b being arranged in the intake line 6a of the intake system 6. The charge air supplied to the internal combustion engine 13 is compressed in the compressor 12b, for which purpose the enthalpy of the exhaust-gas flow is utilized in the turbine 12a. In turn, rotation of the turbine is used drive the compressor. Therefore, it will be appreciated that the compressor 12b is configured to provide boost to the cylinders. Additionally, in one example the turbine 12a may be a variable geometry turbine configured to adjust the aspect ratio of the turbine. Still further in one example, the turbine 12a may include a wastegate configured to adjust an amount of exhaust gas flow bypassing the turbine.

An exhaust-gas aftertreatment system 16 may also be included in the engine 13. The exhaust-gas aftertreatment system 16 may include a particle filter 16 positioned downstream of the turbine 12a. However, the exhaust-gas aftertreatment system 16 may include additional or alternative emission control devices such as catalysts.

The internal combustion engine 13 may also be equipped with an exhaust-gas recirculation (EGR) arrangement 14, specifically with a low-pressure EGR arrangement 14, in the depicted example. For this purpose, a line 15 for the recirculation of exhaust gas branches off from the exhaust-gas discharge system 8 downstream of the particle filter 16 and issues into the intake system 6 upstream of the compressor 12b. In the line 15 of the exhaust-gas recirculation arrangement 14 there is arranged an EGR valve 15a for the adjustment of the recirculated exhaust-gas flow rate and a cooler 15b for cooling the recirculated exhaust gas. Thus, the EGR arrangement 14 is a low pressure EGR arrangement. It will be appreciated that additional or alternative EGR arrangements may be incorporated into the engine 13.

The four cylinders 1, 2, 3, 4 are configured and form two groups with in each case two cylinders 1, 2, 3, 4, wherein the two outer cylinders 1, 4 form a first group, the cylinders 1, 4 of which are in operation even in the event of a partial deactivation of the internal combustion engine 13, and the two inner cylinders 2, 3 form a second group, the cylinders 2, 3 of which are formed as load-dependently switchable cylinders 2, 3 which are deactivated during a partial deactivation. However, in the case of a two cylinder engine one cylinder is included in the first group and one cylinder is included in the second group. Thus, the cylinders (2 and 3) may be selectively deactivatable cylinders and the cylinder (1 and 4) may be active cylinders. It will be appreciated that the active cylinders operates in the event of partial cylinder deactivation (i.e., deactivation of one or more of cylinders (2 and 3). The selectively deactivatable cylinders may be switched into a deactivated state during selected periods of engine operation. That is to say, that fuel, intake airflow, and/or spark provided to the cylinder may be decreased or inhibited during these selected time periods of partial deactivation.

The engine 13 may also include intake shut-off elements 9 (e.g., valves such as flapper valves) provided in the intake lines 5b of the two inner cylinders 2, 3, which opens up the intake lines 5b for the supply of charge air via the intake system 6 when the inner cylinders 2, 3 are activated, and block said intake lines when the two inner cylinders 2, 3 are or have been deactivated for the purposes of the partial deactivation of the internal combustion engine 13. Thus, the intake shut-off elements may substantially block intake air-flow into the downstream cylinders, during selected time intervals.

In order to enable generation of a desired charge pressure (e.g., high charge pressure) during partial deactivation of the internal combustion engine 13, during which the inner cylinders 2, 3 are deactivated and a reduced exhaust-gas flow is available at the turbine 12a, a blower 10 may be provided in the intake system 6 on the inlet side 6 downstream of the compressor 12b. The blower 10 is configured to increase charge air pressure provided to the cylinders (e.g., active cylinders). The blower 10 may be mechanically driven, in one example. However, in other examples the blower may be electrically driven.

During deactivation of the inner cylinders 2, 3, a bypass line 11 which bypasses the blower 10, and which branches off from the intake system 6 between the compressor 12b and the blower 10 and issues into the intake system 6 again downstream of the blower 10, may be blocked. For this purpose, a bypass shut-off element 11a is provided in the bypass line 11. Thus, the bypass shut-off element 11a may be closed while cylinders (2 and 3) are deactivated and opened when cylinders (2 and 3) are activated and performing combustion cycles.

The engine 13 may further include exhaust shut-off elements 40 positioned in the exhaust lines 7b associated with cylinders (2 and 3). The exhaust shut-off elements 40 are configured to inhibit and permit exhaust gas flow therethrough in a closed and open configuration, respectively. The shut-off elements may be valves, for example. Specifically, the shut-off elements may be closed when the cylinders (2 and 3) are deactivated and opened when the cylinders 2 and 3 are performing combustion.

The engine 13 may further include high pressure EGR lines 50 coupled directly upstream and downstream of the cylinders (2 and 3). It will be appreciated that directly upstream and downstream implies that there are no intervening components positioned between the openings of the EGR lines and the cylinders. However, in one example a single EGR line may be coupled to the intake and exhaust line downstream of the confluence of the intake lines 5b and the exhaust lines 7b. EGR shut-off elements 52 (e.g., EGR valves) may be positioned in the EGR lines 50. The EGR shut-off elements 52 are configured to permit and inhibit exhaust gas flow therethrough. Specifically, in one example the EGR shut-off elements 52 may be opened when the cylinders (2 and 3) are deactivated and closed when the cylinders (2 and 3) are activated. It will be appreciated that in other examples, the exhaust shut-off elements 40, the high pressure EGR lines 50, and/or EGR shut-off elements 52 may be omitted from the engine 13, in other examples.

The engine 13 further includes a controller 100. The controller 100, in this particular example, includes an electronic control unit comprising one or more of an input/output device 110, a central processing unit (CPU) 108, read-only memory (ROM) 112, random-accessible memory (RAM) 114, and keep-alive memory (KAM) 116. Engine controller 100 may receive various signals from sensors coupled to engine 12, including measurement of inducted mass air flow (MAF) from mass air flow sensor (not shown); engine coolant temperature (ECT) from temperature sensor (not shown); exhaust gas air/fuel ratio from exhaust gas sensor (not shown); operator input device 132 (i.e., throttle pedal); etc. As shown, the operator input device 132 can be actuated via a driver 130 and in response to actuation of the operator input device 132 a device sensor 134 provides a pedal position (PP) signal to the controller 100. Furthermore, engine controller 100 may monitor and adjust the position of various actuators based on input received from the various sensors. These actuators may include, for example, the intake shut-off elements 9, bypass shut-off element 11a, exhaust shut-off elements 40, EGR shut-off elements 52, EGR valve 15a, intake valve assemblies 34, and/or exhaust valve assemblies 36 may be controlled via the controller. The aforementioned control techniques for the actuators can be implemented via the controller 100. Storage medium read-only memory 112 can be programmed with computer readable data representing instructions executable by processor 108 for performing the methods described below, as well as other variants that are anticipated but not specifically listed thereof.

Figure 2:
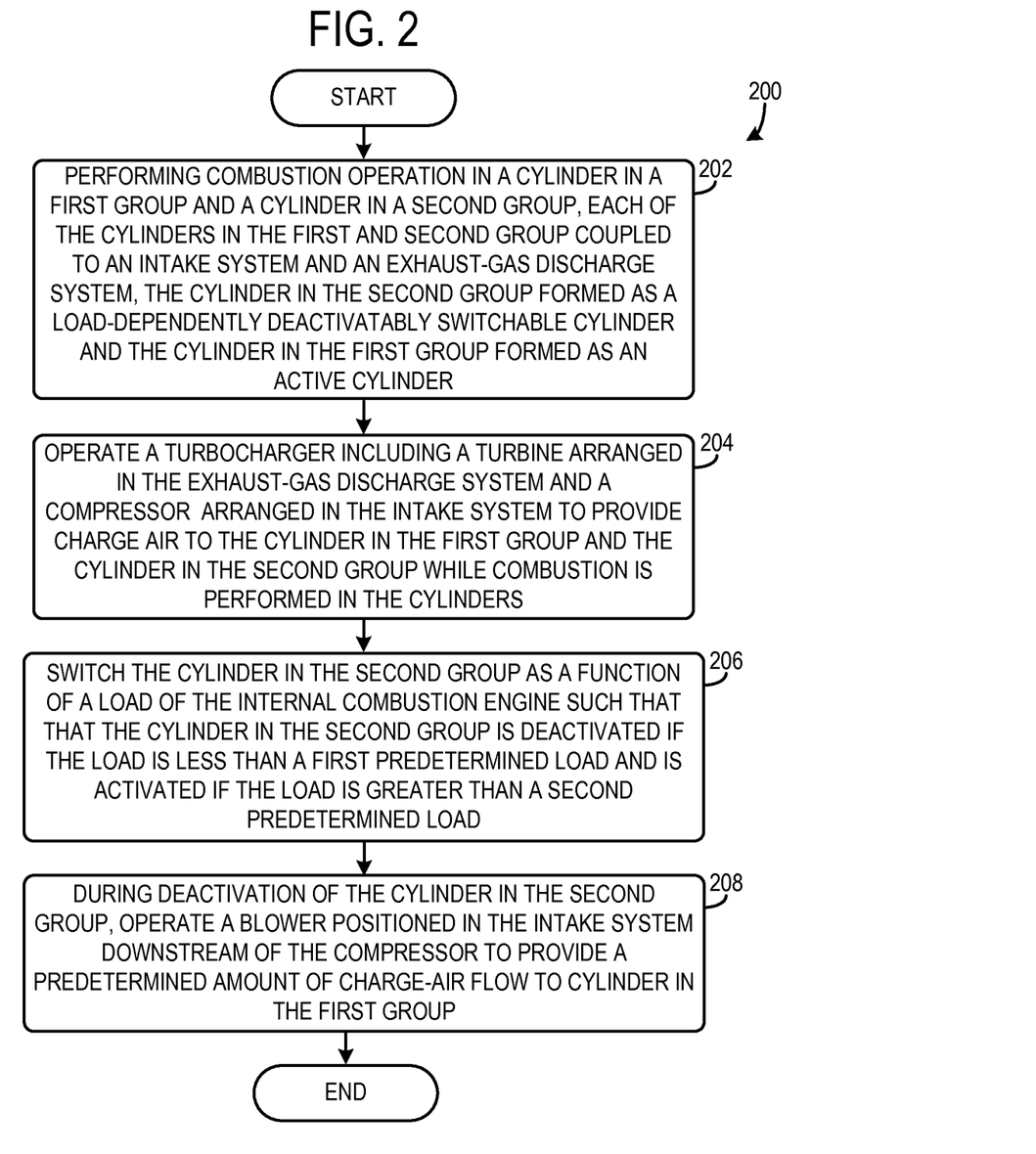
FIG. 2 shows a method for operation of an internal combustion engine.

FIG. 2 shows a method 200 for operating an internal combustion engine. The method 200 may be implemented via the engine and engine systems described above with regard to FIG. 1 or may be implemented via other suitable engines and engine systems.

At 202 the method includes performing combustion operation in a cylinder in a first group and a cylinder in a second group, each of the cylinders in the first and second group coupled to an intake system and an exhaust-gas discharge system, the cylinder in the second group formed as a load-dependently deactivatably switchable cylinder and the cylinder in the first group formed as an active cylinder.

Next at 204 the method includes operating a turbocharger including a turbine arranged in the exhaust-gas discharge system and a compressor arranged in the intake system to provide charge air to the cylinder in the first group and the cylinder in the second group while combustion is performed in the cylinders.

At 206 the method includes switching the cylinder in the second group as a function of a load of the internal combustion engine such that that the cylinder in the second group is deactivated if the load is less than a first predetermined load and is activated if the load is greater than a second predetermined load. At 208 the method includes during deactivation of the cylinder in the second group, operate a blower positioned in the intake system downstream of the compressor to provide a predetermined amount of charge-air flow to cylinder in the first group. In one example, the supply of charge air provided by the turbocharger to the cylinder in the second group is reduced or stopped during deactivation of the cylinder in the second group. In yet another example, during deactivation of the cylinder in the second group, exhaust gas is flowed into the cylinder of the second group via operation of an exhaust gas recirculation (EGR) valve positioned in an EGR line coupled directly upstream and downstream of the cylinder. Further in one example, the where the blower may be mechanically driven.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine comprising:
   an active cylinder;
   a selectively deactivatable cylinder, the active cylinder and the selectively deactivatable cylinder each coupled to an intake system and an exhaust-gas discharge system, and the selectively deactivatable cylinder further coupled to an exhaust gas recirculation (EGR) line, the EGR line coupled directly upstream and downstream of the selectively deactivatable cylinder;
   an exhaust-gas turbocharger having a turbine positioned in the exhaust-gas discharge system and a compressor positioned in the intake system;
   a blower positioned in the intake system downstream of the compressor; and
   a bypass line bypassing the blower and including a shut-off valve.

2. The internal combustion engine of claim 1, further comprising a controller configured to deactivate the selectively deactivatable cylinder during a selected time interval and operate the blower and the shut-off valve to provide a predetermined amount of charge-air flow to the active cylinder during the selected time interval.

3. The internal combustion engine of claim 1, where the blower is mechanically driven.

4. The internal combustion engine of claim 1, further comprising an EGR valve positioned in the EGR line.

5. The internal combustion engine of claim 4, further comprising a controller configured to open the EGR valve during deactivation of the selectively deactivatable cylinder and close the EGR valve.

6. An internal combustion engine comprising:
   one or more cylinders in a first group formed as active cylinders which operate in the event of partial cylinder deactivation;
   one or more cylinders in a second group formed as a load-dependently deactivatably switchable cylinders, each of the cylinders in the first and second groups coupled to an intake system and an exhaust-gas discharge system, where the load-dependently deactivatably switchable cylinders are each further coupled to an EGR line, the EGR line including an EGR shut-off element positioned therein, and where the active cylinders are not coupled to the EGR line;
   an exhaust-gas turbocharger including a turbine arranged in the exhaust-gas discharge system and a compressor arranged in the intake system;
   a blower positioned in the intake system downstream of the compressor; and
   a bypass line branching off from the intake system between the compressor and the blower and issuing into the intake system downstream of the blower, where a bypass shut-off element is positioned in the bypass line.

7. The supercharged internal combustion engine of claim 6, where an inlet side of each of the cylinders in the second group is equipped at least with a variable valve assembly.

8. The internal combustion engine of claim 6, where an intake line associated with each of the cylinders in the second group is equipped with an intake shut-off element.

9. The supercharged internal combustion engine of claim 8, where the intake shut-off element is switchable in a two-stage fashion between a closed position and an open position.

10. The internal combustion engine of claim 8, where the intake shut-off element is continuously adjustable.

11. The internal combustion engine of claim 6, further comprising a controller including instructions for:
    opening the EGR shut-off element when the deactivatable cylinders are deactivated; and
    closing the EGR shut-off element when the deactivatable cylinders are activated.

12. The internal combustion engine of claim 11, where the EGR line branches off from the exhaust-gas discharge system upstream of an exhaust shut-off element and issues into an intake system of the cylinders in the second group.

13. The internal combustion engine of claim 6, where the blower is a mechanically driven blower.

14. The internal combustion engine of claim 6, where the blower is an electrically driven blower.

15. The internal combustion engine of claim 6, where the blower is configured to increase a charge-air flow rate provided by the intake system during partial deactivation of the cylinders in the second group.

16. The internal combustion engine of claim 6, where both the first group and the second group are arranged in an in-line cylinder configuration.

17. A method for operating an internal combustion engine comprising:
    performing combustion operation in a cylinder in a first group and a cylinder in a second group, each of the cylinders in the first and second groups coupled to an intake system and an exhaust-gas discharge system, the cylinder in the second group formed as a load-dependently deactivatably switchable cylinder and the cylinder in the first group formed as an active cylinder;
    operating a turbocharger including a turbine arranged in the exhaust-gas discharge system and a compressor arranged in the intake system to provide charge air to the cylinder in the first group and the cylinder in the second group while combustion is performed in the cylinders;
    switching the cylinder in the second group as a function of a load of the internal combustion engine such that that the cylinder in the second group is deactivated; and
    during deactivation of the cylinder in the second group, operating a blower positioned in the intake system downstream of the compressor to provide a predetermined amount of charge-air flow to the cylinder in the first group, the deactivated cylinder in the second group operated to pump recirculated exhaust gas from an inlet side to an outlet side of the deactivated cylinder.

18. The method of claim 17, where a supply of charge air provided by the turbocharger to the cylinder in the second group is reduced or stopped during deactivation of the cylinder in the second group.

19. The method of claim 17, where, during deactivation of the cylinder in the second group, the exhaust gas is flowed into the cylinder of the second group via operation of an exhaust gas recirculation (EGR) valve positioned in an EGR line coupled directly upstream and downstream of the cylinder of the second group.

20. The method of claim 17, where the blower is mechanically driven.

* * * * *